US012670887B2

(12) United States Patent
Yamashita

(10) Patent No.: US 12,670,887 B2
(45) Date of Patent: Jun. 30, 2026

(54) PIANO INCLUDING DROP ACTION

(71) Applicant: KABUSHIKI KAISHA KAWAI GAKKI SEISAKUSHO, Hamamatsu (JP)

(72) Inventor: Mitsuo Yamashita, Hamamatsu (JP)

(73) Assignee: KABUSHIKI KAISHA KAWAI GAKKI SEISAKUSHO, Hamamatsu (JP)

( * ) Notice: Subject to any disclaimer, the term of this patent is extended or adjusted under 35 U.S.C. 154(b) by 302 days.

(21) Appl. No.: 18/618,744

(22) Filed: Mar. 27, 2024

(65) Prior Publication Data

US 2024/0331662 A1 Oct. 3, 2024

(30) Foreign Application Priority Data

Mar. 31, 2023 (JP) ................................ 2023-057064

(51) Int. Cl.
*G10C 3/163* (2019.01)
*G10C 3/16* (2019.01)
*G10C 3/161* (2019.01)
*G10C 3/18* (2006.01)

(52) U.S. Cl.
CPC .............. *G10C 3/163* (2013.01); *G10C 3/16* (2013.01); *G10C 3/161* (2013.01); *G10C 3/18* (2013.01)

(58) Field of Classification Search
CPC .......... G10C 3/163; G10C 3/161; G10C 3/16; G10C 3/18
USPC .......................................................... 84/240
See application file for complete search history.

(56) References Cited

U.S. PATENT DOCUMENTS

| | | | | |
|---|---|---|---|---|
| 10,311,836 B2 * | 6/2019 | Ohba | ...................... | G10H 1/34 |
| 2025/0285603 A1 * | 9/2025 | Yamashita | .............. | G10C 3/18 |

FOREIGN PATENT DOCUMENTS

| | | |
|---|---|---|
| JP | S49-2178 | 1/1974 |

* cited by examiner

*Primary Examiner* — Laura K Tso

(74) *Attorney, Agent, or Firm* — Womble Bond Dickinson (US) LLP

(57) ABSTRACT

A piano including a drop action is provided with an upper first key pivotally movable and a lower second key pivotally supported by a support member and having a front end contacted by the first key. In accordance with depression of the first key, the second key pivotally moves to lift up a wippen of the action via a connection member (wire member), whereby a string is struck by a hammer. The support member has a plurality of support walls formed with bearing grooves which extend obliquely with respect to a vertical direction. The second key includes a pair of shafts protruding toward opposite lateral sides and is pivotally supported by the support member in a state in which the shafts are engaged with bottoms of the bearing grooves formed in each adjacent two support walls.

4 Claims, 5 Drawing Sheets

PIANO INCLUDING DROP ACTION

CROSS-REFERENCE TO RELATED APPLICATIONS

This application claims priority to Japanese Patent Application Number 2023-057064, filed on Mar. 31, 2023, the entire content of each of which is incorporated herein by reference.

BACKGROUND OF THE INVENTION

Field of the Invention

The present invention relates to a piano including a drop action which is an action disposed below a keyboard.

Description of the Related Art

Conventionally, as a piano including a drop action, there has been known, for example, one disclosed in Japanese Examined Utility Model Publication No. S49-2178. This piano includes a plurality of keys (white keys and black keys) which extend in a front-rear direction and are pivotally supported at central portions thereof by balance rail pins, and actions which are disposed rearward of the respective keys, for driving hammers upon key depression. The construction of each action is basically the same as that of a normal action of an upright piano. The action includes a pivotally movable wippen, a jack mounted on the wippen, and a pivotally movable butt integrally formed with the hammer and contacted by the jack from below.

The wippen is connected to a lower end of an extension lever made of metal, and an upper end of the extension lever is connected to a capstan screw screwed into a rear end of an associated one of the keys. In the construction described above, when the associated key is depressed, the key pivotally moves about the balance rail pin, and the rear end of the key moves upward, whereby the wippen is lifted up via the extension lever. In accordance therewith, the wippen pivotally moves upward and the jack pushes up the butt to cause the hammer to pivotally move rearward, whereby a string is struck by the hammer.

In the conventional piano described above, due to construction thereof, to secure a pivotal stroke of the wippen, which is approximately equal to a key depression stroke, for example, a length from the balance rail pin, which is a fulcrum of the key, to the rear end of the key is required to be set to be approximately equal to a length from the balance rail pin to a front end of the key, which increases the whole length of the key, and accordingly a depth (a length in the front-rear direction) of the piano. To eliminate such a problem, it is envisaged to form the key by two tiers of upper and lower keys, pivotally support a first key as the upper key and a second key as the lower key at a rear end and a central portion thereof, respectively, and connect a rear end of the second key and the wippen by a connection member, whereby when a front end of the second key is depressed by the first key, the wippen is caused to pivotally move upward via the connection member.

However, in the above-described two-tier construction of the key, assuming that the first key and the second key are supported using the balance rail pins disclosed in the conventional piano, there arise the following problems: In the support structure using the balance rail pins, it is required to form key frames, the balance rail pins erected on the key frames, plates affixed to upper surfaces of key bodies, bushing cloths affixed to wall surfaces of balance rail pin holes, and so forth, on a key-by-key basis. Therefore, the number of components is large, and it is required not only to dispose these components but also to form the balance rail pin holes in the key bodies and the plates. Since the number of working steps is also large, manufacturing costs are liable to be increased. Further, since the key frames are mounted on the key bodies, and the balance rail pins extend into the key bodies, a vertical length of the support structure is liable to be increased. For this reason, when both the first key and the second key are supported by the balance rail pins, the manufacturing costs are increased, and the vertical length of the key support structure and accordingly a height of the piano are increased.

SUMMARY OF THE INVENTION

It is an object of the present invention to provide a piano including a drop action, which, in a case where the piano includes an upper first key and a lower second key, is capable of achieving reduction of manufacturing costs and a vertical length of a second key support structure, by reducing the number of components and that of working steps of the support structure and securing a stable operation of the second key.

To attain the above object, the present invention provides a piano including a drop action, including a first key extending in a front-rear direction and having a rear end thereof pivotally supported, for being operated by a player, a second key disposed below the first key and having a central portion thereof pivotally supported by a support member, for having a front end thereof contacted by the first key, an action including a wippen disposed below the second key, the wippen pivotally moving upward to drive a hammer and thereby cause the hammer to strike a string, and a connection member connected to a rear end of the second key and the wippen, for lifting up the wippen in accordance with upward pivotal movement of the rear end of the second key in accordance with depression of the first key, wherein the support member includes a plurality of support walls extending in a vertical direction and arranged side by side in a left-right direction, each of the plurality of support walls being formed with a bearing groove extending obliquely with respect to the vertical direction, the bearing groove being open upward and closed downward, there being defined a key guide groove between each adjacent two of the support walls, and wherein the second key has a pair of pin-shaped shafts protruding toward opposite lateral sides from the central portion thereof and is accommodated in an associated one of the key guide grooves, the second key being pivotally supported by the support member in a state in which the shafts are engaged with bottoms of the respective bearing grooves formed in the adjacent two support walls.

According to the construction described above, the piano includes the first key operated by the player, the second key disposed below the first key, the action including the wippen disposed below the second key, and the connection member connected to the rear end of the second key and the wippen. When the first key is depressed during musical performance, the front end of the second key is depressed by a front end of the first key, whereby the second key is pivotally moved about the bottoms of the respective bearing grooves of the support member, with which the shafts are engaged, while being guided by the key guide groove. In accordance with this, the rear end of the second key pivotally moves upward and the connection member lifts up the wippen to cause the wippen to pivotally move upward, whereby the hammer is driven, and the string is struck.

As described above, in the present invention, the components required to support the second key are basically only the shafts formed on the second key and the support member formed with the bearing grooves with which the shafts are engaged. Therefore, compared with a support structure using a balance rail pin, which requires, for each second key, a keyframe, a balance rail pin, a plate, bushing cloth, a balance rail pin hole, and so forth, the number of components and that of working steps can be reduced, thereby making it possible to reduce manufacturing costs. Further, compared with the case where the balance rail pin is erected from the keyframe, the vertical length of the support structure for supporting the second key can be reduced, which in turn makes it possible to reduce the height of the piano.

Further, the second key is accommodated in the associated one of the key guide grooves formed in the support member, and when the second key pivotally moves, the second key is guided by the associated key guide groove, whereby lateral sway of the second key is suppressed. Furthermore, the bearing grooves with which the shafts of the second key are engaged extend obliquely with respect to the vertical direction, whereby upward rebound of the second key having been depressed is suppressed. From the above, it is possible to secure stable operation of the second key.

Preferably, the first key is formed by a white key and a black key, and a white key-associated bearing groove and a black key-associated bearing groove are formed in each of the support walls of the support member as the bearing grooves at respective locations different from each other in the front-rear direction, the second key associated with the white key being engaged with and supported by the white key-associated bearing groove, and the second key associated with the black key being engaged with and supported by the black key-associated bearing groove.

According to the construction of this preferred embodiment, the first key is formed by the white key and the black key, and in each of the support walls of the support member, the white key-associated bearing groove for engagement with and supporting the second key (white key-associated second key) associated with the white key and the black key-associated bearing groove for engagement with and supporting the second key (black key-associated second key) associated with the black key are formed as the bearing grooves. As described above, since the white key-associated second key and the black key-associated second key are supported by a single support member, so that compared with the case where the second keys are supported by respective separately constructed support members, it is possible to reduce the number of components and that of working steps and enhance assembling accuracy of the second keys.

Preferably, the support member is formed as a molded article made of a synthetic resin.

According to the construction of this preferred embodiment, the support member integrally including the plurality of support walls including the bearing grooves and the key guide grooves can be obtained as the molded article made of the synthetic resin at low costs, whereby it is possible to further reduce manufacturing costs. Further, since the molded article has a high dimensional accuracy, it is possible to easily secure required assembling accuracy of the second key to thereby further reduce working steps.

Preferably, the second key has an adjustment screw screwed into a rear end of an upper surface thereof, and has a guide hole, vertically extending therethrough, formed at a location rearward of the adjustment screw, and the connection member is formed by a wire member which is flexible and is inserted through the guide hole, for being stretched between the adjustment screw and the wippen, the second key having a rear end surface thereof formed with a slit vertically extending therethrough and communicating with the guide hole.

According to the construction of this preferred embodiment, the wire member, which is used as the connection member for connecting the second key and the wippen of the action, can be easily inserted into or pulled out from the guide hole via the slit, thereby making it possible to easily mount or remove the wire member e.g. during manufacturing or repairing the piano.

The above and other objects, features, and advantages of the present invention will become more apparent from the following detailed description taken in conjunction with the accompanying drawings.

DETAILED DESCRIPTION OF PREFERRED EMBODIMENTS

Figure 1:
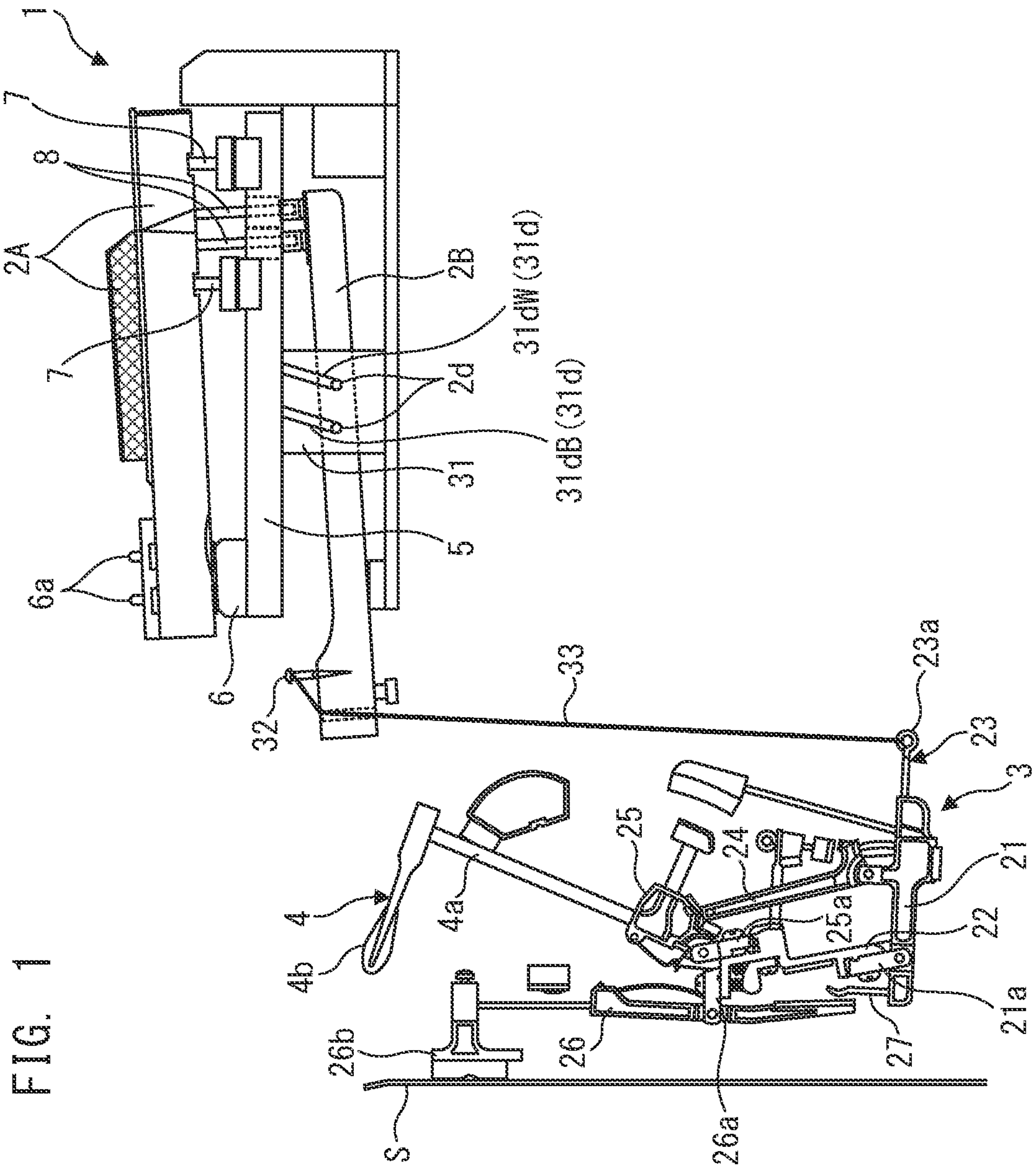
FIG. 1 is a side view showing a keyboard device, an action, and a hammer of a piano to which the present invention is applied, in a key-released state.
Figure 2:
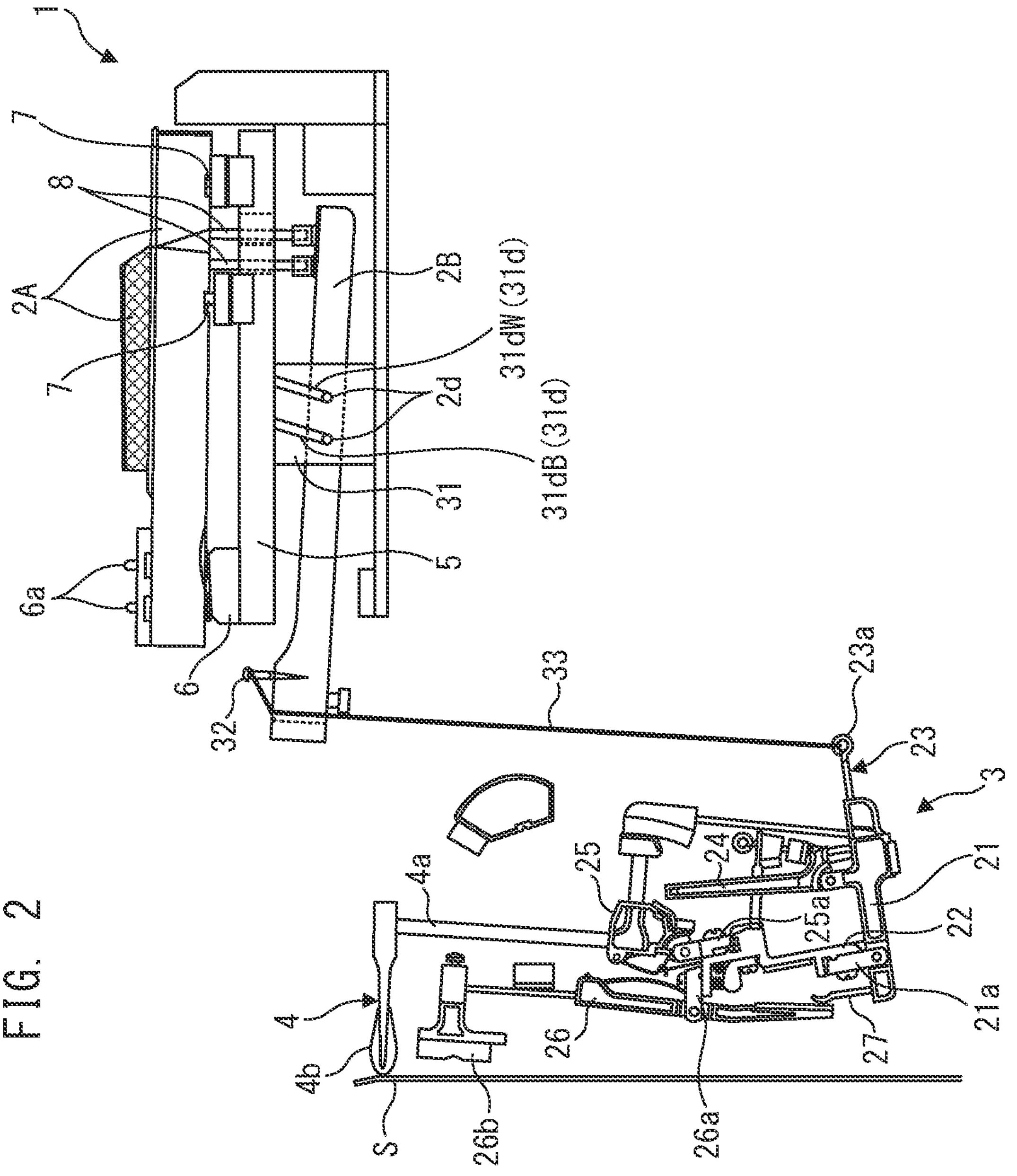
FIG. 2 is a side view of the piano shown in FIG. 1 in a state in which a string is struck.

The present invention will now be described in detail with reference to the drawings showing preferred embodiments thereof. As shown in FIGS. 1 and 2, a piano 1 to which the present invention is applied includes a keyboard 2, actions 3 as drop actions, and hammers 4. Note that in the following description, a near side, a far side, a left side, and a right side, as viewed from a player, of the piano 1 will be referred to as “front”, “rear”, “left”, and “right”, respectively.

Figure 3A:
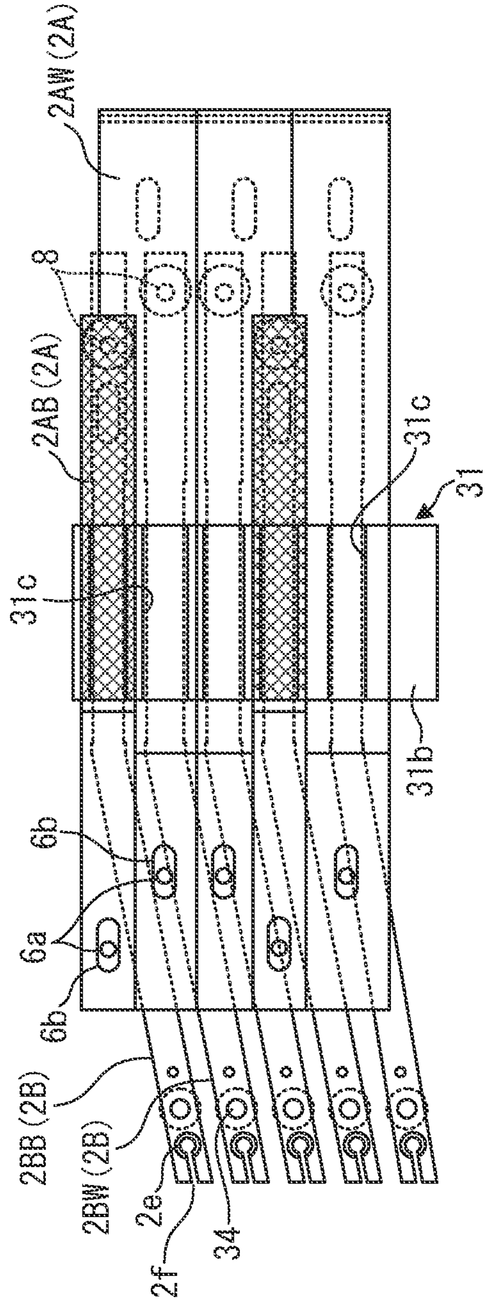
FIGS. 3A and 3B are a plan view and a side view of the keyboard device, respectively.
Figure 3B:
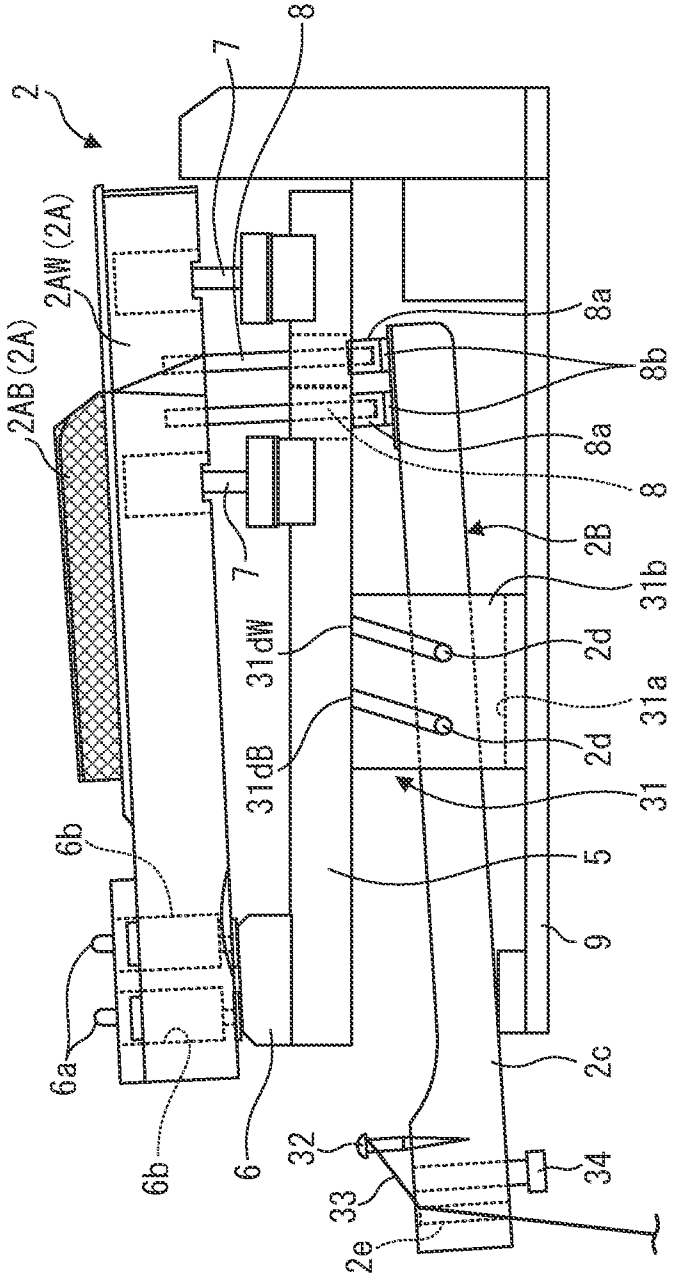
Figure 4A:
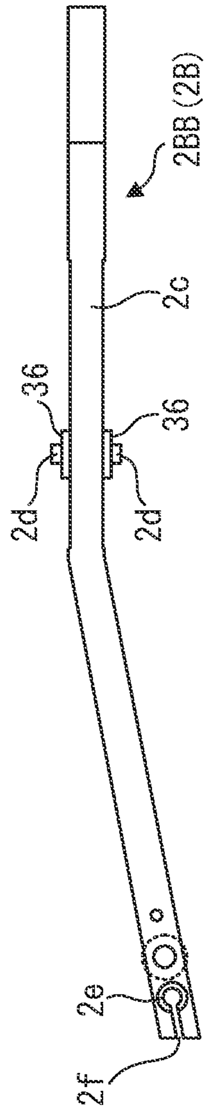
FIGS. 4A and 4B are a plan view and a side view of a black key-associated second key, respectively.
Figure 4B:
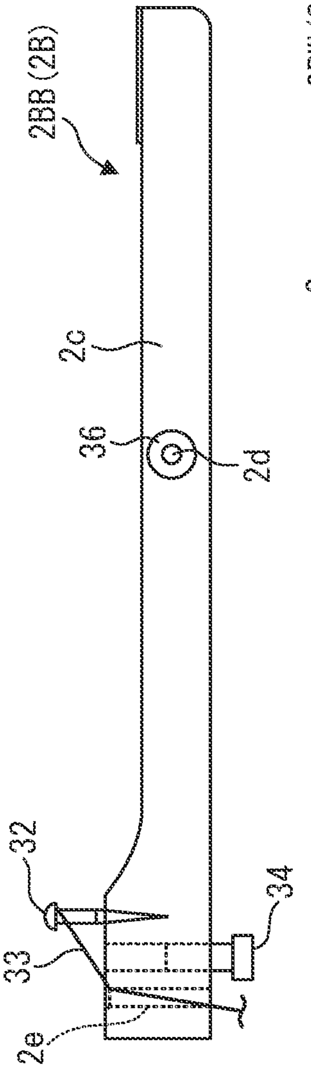
Figure 4C:
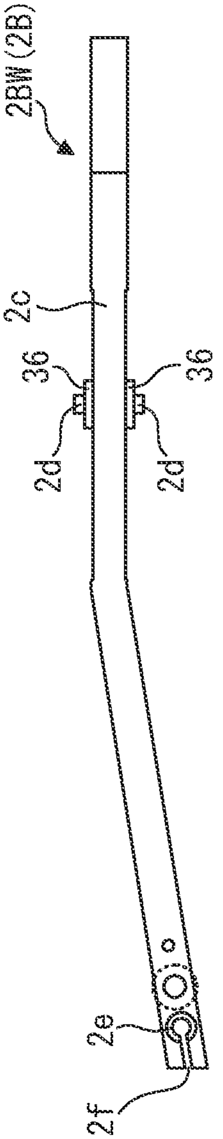
FIGS. 4C and 4D are a plan view and a side view of a white key-associated second key, respectively.
Figure 4D:
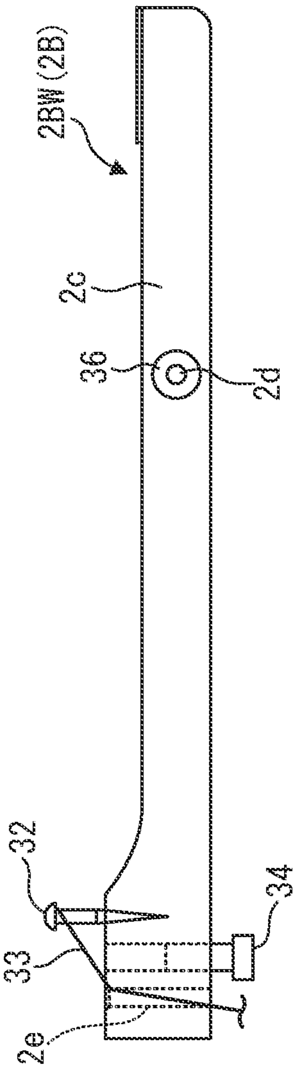

As shown in FIGS. 3A and 3B, the keyboard 2 is provided with a large number of first keys 2A (white keys 2AW and black key 2AB) arranged side by side in a left-right direction of the piano 1, and a large number of second keys 2B (only one of which is shown in FIG. 3B) disposed below the respective first keys 2A and arranged side by side in the left-right direction. Each first key 2A extends in a front-rear direction (in a left-right direction as viewed in FIG. 1), and has a rear end thereof pivotally supported by a balance rail pin 6*a* erected on a keyframe 6 on a keybed 5 through a balance rail pin hole 6*b*, and a front portion thereof guided by a front pin 7.

A front portion of a lower surface of the first key 2A is integrally provided with an actuator pin 8 that extends downward through the keybed 5. The actuator pin 8 has an adjustment cap 8*a* fitted on a lower end thereof. The length of the actuator pin 8 is adjusted by inserting a punching (not shown) into a hole of the adjustment cap 8*a* or shaving off a tip end of the actuator pin 8. Further, the adjustment cap 8*a* has a bushing cloth 8*b* affixed to a lower surface thereof, and the actuator pin 8 is in contact with a front end of an upper surface of an associated one of the second keys 2B via the bushing cloth 8*b*.

Each second key 2B is disposed between the keybed 5 and a bottom board 9 below the keybed 5 and is pivotally supported by a support member 31. As shown in FIGS. 4A to 4D, the second key 2B is formed by a black key-associated second key 2BB, shown in FIGS. 4A and 4B, which is associated with the black key 2AB, and a white key-associated second key 2BW, shown in FIGS. 4C, which is associated with the white key 2AW. The black key-associated second key 2BB and the white key-associated second key 2BW each include a key body 2*c* and a pair of shafts 2*d* and 2*d*. The second keys 2BB and 2BW have respective key bodies 2*c* having the same shape and size and have respective pairs of shafts 2*d* and 2*d* formed at respective locations different from each other in the front-rear direction of the key bodies 2*c*.

Each key body 2*c* extends in the front-rear direction and has a slightly-bent inverted V shape in plan view and a linear shape in side view with a constant height except at a slightly protuberant rear end thereof. An adjustment screw 32 is screwed into a rear end of an upper surface of the key body 2*c*, and immediately rearward of the adjustment screw 32, there is formed a guide hole 2*e* vertically extending through the key body 2*c*. A wire member 33, described hereinafter, has an upper end thereof wound around a shaft of the adjustment screw 32 and is inserted through the guide hole 2*e*. The key body 2*c* has a rear end surface thereof formed with a slit 2*f* which vertically extends through the key body 2*c* and communicates with the guide hole 2*e*. Further, a weight 34 is mounted on the key body 2*c* between the adjustment screw 32 and the guide hole 2*e*. Although not shown, the second key 2B which is not provided with a damper 26*b*, described hereinafter, is sometimes provided with two weights 34 depending on how the second key 2B returns after being depressed.

The shafts 2*d* and 2*d* of the second key 2B, each of which has a pin shape (a short cylindrical shape), are integrally provided on left and right side surfaces of the key body 2*c* and protrude leftward and rightward therefrom, respectively. Further, each shaft 2*d* has a washer 36 mounted thereon, which is made e.g. of a fluorocarbon resin for reducing friction between the shaft 2*d* and a support wall 31*b*, referred to hereinafter. In the case of the white key-associated second key 2BW, the shaft 2*d* is disposed at a substantially intermediate location of the key body 2*c* in the vertical direction, and is disposed, in the front-rear direction, at a location corresponding to one third of the whole length of the key body 2*c* from a front end thereof. On the other hand, in the case of the black key-associated second key 2BB, the shaft 2*d* is disposed at a location slightly higher than and rearward of the shaft 2*d* of the white key-associated second key 2BW. From the above, the heights at which the white key-associated second key 2BW and the black key-associated second key 2BB are disposed, respectively, are adjusted to be equal to each other.

Figure 5A:
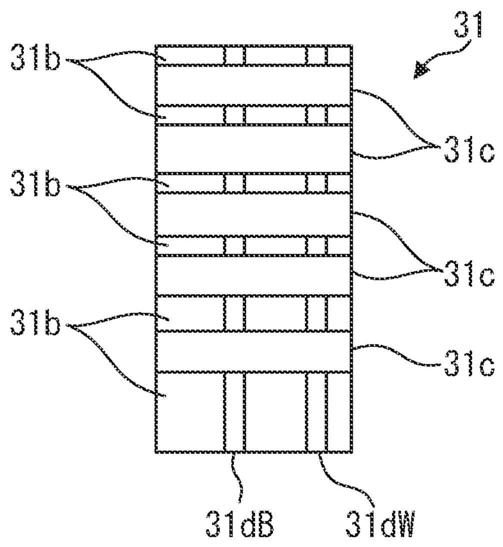
FIGS. 5A to 5C are a plan view, a side view, and a partial perspective view of a support member, respectively.
Figure 5B:
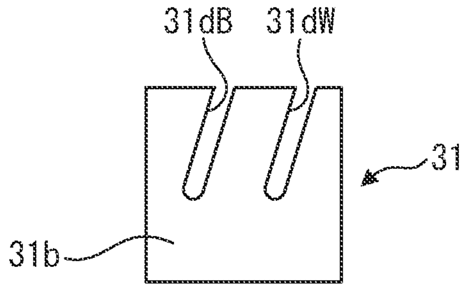
Figure 5C:
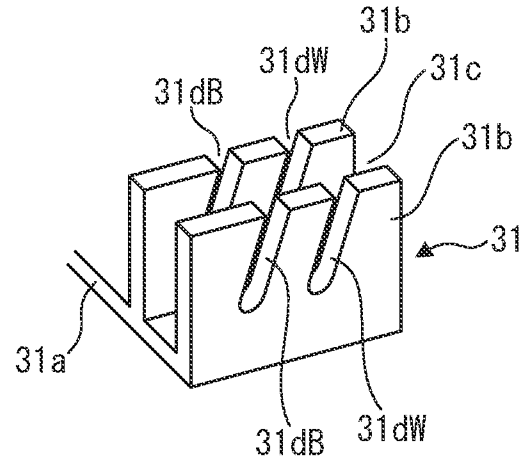

The support member 31 supporting the second key 2B is formed as a molded article made of a synthetic resin (e.g. ABS resin containing carbon fiber or carbon powder, ABS resin, or polyacetal resin), and as shown in FIGS. 5A to 5C, includes a base 31*a* and a plurality of (six in the illustrated example) support walls 31*b* erected on the base 31*a* and integrally formed with the base 31*a*. The support member 31 is screwed to the bottom board 9 via the base 31*a*. The plurality of support walls 31*b* extend upward from the base 31*a* and are arranged side by side in the left-right direction. Between each adjacent two of the support walls 31*b*, there is defined a key guide groove 31*c*. Each support wall 31*b* is formed with a white key-associated bearing groove 31*d*W at a front-side location thereof and a black key-associated bearing groove 31*d*B at a rear-side location thereof. The two bearing grooves 31*d*W and 31*d*B are formed in parallel with each other and extend obliquely with respect to the vertical direction. The bearing grooves 31*d*W and 31*d*B are open upward and closed downward and have the same depth (length). Note that in FIG. 3A, all the components of the support member 31 are indicated by solid lines so as to prevent FIG. 3A from becoming complicated due to indication of the support member 31 by broken lines.

As shown in FIGS. 3A and 3B, the shafts 2*d* and 2*d* of the white key-associated second key 2BW are inserted into the white key-associated bearing grooves 31*d*W and 31*d*W of associated two of the support walls 31*b* and 31*b* from above, respectively. With this, the white key-associated second key 2BW is pivotally supported by the support member 31 in a state in which the key body 2*c* is accommodated in an associated one of the key guide grooves 31*c* and the shafts 2*d* are engaged with the bottoms of the respective white key-associated bearing grooves 31*d*W of the support walls 31*b*. On the other hand, the shafts 2*d* and 2*d* of the black key-associated second key 2BB are inserted into the black key-associated bearing grooves 31*d*B and 31*d*B of associated two of the support walls 31*b* and 31*b* from above, respectively. With this, the black key-associated second key 2BB is pivotally supported by the support member 31 in a state in which the key body 2*c* is accommodated in an associated one of the key guide grooves 31*c* and the shafts 2*d* are engaged with the bottoms of the respective black key-associated bearing grooves 31*d*B of the support walls 31*b*.

The actions 3 are disposed rearward of and downward of the first keys 2A and the second keys 2B, and each include a wippen 21 provided for each first key 2A. The wippen 21 has a rear end thereof pivotally supported by a center rail 22 extending in the left-right direction, via a wippen flange 21*a*. A mounting screw 23 including a ring portion 23*a* is screwed into a front end of the wippen 21, and the wire member 33 is attached to the mounting screw 23 by engagement of a lower end of the wire member 33 with the ring portion 23*a*.

The wire member 33 is made of a material having appropriate flexibility and strength, for example, a material which includes a core material formed by high-strength nylon and has a surface thereof coated with fiber, carbon, or the like. The wire member 33 is stretched between the adjustment screw 32 of the second key 2B and the mounting screw 23 of the wippen 21. The stretching degree of the wire member 33 is adjusted by turning the adjustment screw 32 to change the amount of winding of the wire member 33 around a shaft of the adjustment screw 32.

The constructions of components of the action 3 other than the wippen 21 are basically the same as those of a normal action of the upright piano, and hence a brief description will be given in the following. The action 3 includes a jack 24, a butt 25, and a damper lever 26, which are provided for each first key 2A.

The jack 24 has an L shape formed by a base portion extending forward and a hammer push-up portion extending upward from a rear end of the base portion and is pivotally mounted on a central portion of the wippen 21 via a corner portion formed by the base portion and the hammer push-up portion.

The butt 25 is pivotally supported by the center rail 22 via a butt flange 25*a* and is contacted by the hammer push-up portion of the jack 24 from below in a key-released state of the first key 2A. On an upper end of the butt 25, there is provided a hammer shank 4*a* of the hammer 4. The hammer shank 4*a* has an upper end thereof provided with a hammer head 4*b*. The hammer head 4*b* is opposed to a string S stretched at a rearward location in the key-released state of the first key 2A.

Further, the damper lever 26 extends vertically and has a central portion thereof pivotally supported by the center rail 22 via a damper flange 26*a*. The damper lever 26 has an upper end formed with the damper 26*b*. The damper 26*b* presses the string S in the key-released state of the first key 2A, and a spoon 27 erected on a rear end of the wippen 21 is opposed to a lower end of the damper lever 26 from the front side.

Next, a description will be given of the operation of the piano 1 constructed as described above. When the first key 2A is depressed by a player from the key-released state shown in FIG. 1, the first key 2A pivotally moves downward (in a clockwise direction as viewed in FIG. 1) about the balance rail pin 6*a* formed on the rear end thereof to thereby depress the front end of the second key 2B via the actuator pin 8. This causes the second key 2B to pivotally move about the bottoms of the bearing grooves 31*d* with which the shafts 2*d* are engaged, in the clockwise direction, similarly to the first key 2A, and causes the rear end of the second key 2B to move upward, whereby the wippen 21 is lifted up via the wire member 33. In accordance with this, the wippen 21 is pivotally moved upward, and the jack 24 formed on the wippen 21 pushes up the butt 25, whereby the hammer 4 integrally formed with the butt 25 pivotally moves rearward to strike the string S (the state shown in FIG. 2).

Further, in accordance with the pivotal movement of the wippen 21, the spoon 27 integrally formed with the wippen 21 moves reward to press the lower end of the damper lever 26, whereby the damper lever 26 pivotally moves in the clockwise direction, for causing the damper 26*b* to move away from the string S, whereby tone generation by vibration of the string S is ensured.

As described hereinabove, according to the present embodiment, the components required to support the second key 2B are basically only the shafts 2*d* formed on the second key 2B and the support member 31 formed with the bearing grooves 31*d* with which the shafts 2*d* are engaged. Therefore, compared with the support structure using the balance rail pin, which requires, for each second key, the keyframe, the balance rail pin, the plate, the bushing cloth, the balance rail pin hole, and so forth, the number of components and that of working steps can be reduced, thereby making it possible to reduce manufacturing costs. Further, compared with the case where the balance rail pin is erected from the keyframe, the vertical length of the support structure for supporting the second key 2B can be reduced, which in turn makes it possible to reduce the height of the piano 1.

Further, the white key-associated bearing groove 31*d*W and the black key-associated bearing groove 31*d*B are formed in the support member 31 as the bearing grooves 31*d*, and the white key-associated second key 2BW and the black key-associated second key 2BB are supported by the single support member 31, so that compared with the case where the two second keys 2BW and 2BB are supported by separate support members, it is possible to further reduce the number of components and that of working steps.

Further, each second key 2B is accommodated in an associated one of the key guide grooves 31*c* formed in the support member 31, and when the second key 2B pivotally moves, the second key 2B is guided by the associated key guide groove 31*c*, whereby lateral sway of the second key 2B is suppressed. Furthermore, the bearing grooves 31*d* with which the shafts 2*d* of the second key 2B are engaged extend obliquely with respect to the vertical direction, whereby upward rebound of the second key 2B having been depressed is suppressed. From the above, it is possible to secure stable operation of the second key 2B.

Furthermore, since the support member 31 is formed as a molded article made of a synthetic resin, which is manufactured at low costs and has a high dimensional accuracy, it is possible not only to further reduce manufacturing costs but also to easily secure required assembling accuracy of the second key 2B and further reduce working steps.

Further, the wire member 33 can be easily inserted into or pulled out from the guide hole 2*e* via the slit 2*f* formed in the rear end of the second key 2B, which makes it possible to easily mount or remove the wire member 33 e.g. during manufacturing or repairing the piano 1.

Note that the present invention is by no means limited to the above-described embodiment but can be practiced in various forms. For example, although in the embodiment, to make the heights at which the white key-associated second key 2BW and the black key-associated second key 2BB are disposed, respectively, equal to each other, the heights of the shafts 2*d* of the two second keys 2BW and 2BB are set to be different from each other, whereas the depths of the white key-associated bearing groove 31*d*W and the black key-associated bearing groove 31*d*B are set to be equal to each other. This relationship between height and depth can be reversed, that is, the heights of the shafts 2*d* of the two second keys 2BW and 2BB can be set to be equal to each other, whereas the depths of the two bearing grooves 31*d*W and 31*d*B can be set to be different from each other.

Further, although in the above-described embodiment, five second keys 2B are supported by one support member 31, the number of the second keys 2B can be set as desired. For example, one octave section of the second keys 2B can be supported by one support member 31.

Further, although the wire member 33, which is flexible, is used as a connection member for connecting the rear end of the second key 2B and the wippen 21, similar to the case of the conventional piano, to employ a rigid material made e.g. of metal is also within the scope of the subject matter of the present invention. Further, although the material is described to be used which includes a core material formed by high-strength nylon and has a surface thereof coated with fiber, carbon, or the like, for the wire material 33, another material can be used insofar as it has appropriate flexibility and strength. Furthermore, although in the above-described embodiment, the actuator pin 8 for transmitting the movement of the first key 2A to the second key 2B is formed in the first key 2A, the actuator pin 8 can be formed in the second key 2B such that it protrudes upward.

It is further understood by those skilled in the art that the foregoing are preferred embodiments of the invention, and that various changes and modifications may be made without departing from the spirit and scope thereof.

What is claimed is:

1. A piano including a drop action, comprising:

a first key extending in a front-rear direction and having a rear end thereof pivotally supported, for being operated by a player;

a second key disposed below the first key and having a central portion thereof pivotally supported by a support member, for having a front end thereof contacted by the first key;

an action including a wippen disposed below the second key, the wippen pivotally moving upward to drive a hammer and thereby cause the hammer to strike a string; and a connection member connected to a rear end of the second key and the wippen, for lifting up the wippen in accordance with upward pivotal movement of the rear end of the second key in accordance with depression of the first key, wherein the support member includes a plurality of support walls extending in a vertical direction and arranged side by side in a left-right direction, each of the plurality of support walls being formed with a bearing groove extending obliquely with respect to the vertical direction, the bearing groove being open upward and closed downward, there being defined a key guide groove between each adjacent two of the support walls, and wherein the second key has a pair of pin-shaped shafts protruding toward opposite lateral sides from the central portion thereof and is accommodated in an associated one of the key guide grooves, the second key being pivotally supported by the support member in a state in which the shafts are engaged with bottoms of the respective bearing grooves formed in the adjacent two support walls.

2. The piano according to claim 1, wherein the first key is formed by a white key and a black key, and a white key-associated bearing groove and a black key-associated bearing groove are formed in each of the support walls of the support member as the bearing grooves at respective locations different from each other in the front-rear direction, the second key associated with the white key being engaged with and supported by the white key-associated bearing groove, and the second key associated with the black key being engaged with and supported by the black key-associated bearing groove.

3. The piano according to claim 1, wherein the support member is formed as a molded article made of a synthetic resin.

4. The piano according to claim 1, wherein the second key has an adjustment screw screwed into a rear end of an upper surface thereof, and has a guide hole, vertically extending therethrough, formed at a location rearward of the adjustment screw, wherein the connection member is formed by a wire member which is flexible and is inserted through the guide hole, for being stretched between the adjustment screw and the wippen, and wherein the second key has a rear end surface thereof formed with a slit vertically extending therethrough and communicating with the guide hole.

* * * * *